United States Patent [19]

Winful et al.

[11] Patent Number: 4,497,535

[45] Date of Patent: Feb. 5, 1985

[54] OPTICAL PULSE GENERATOR

[75] Inventors: Herbert G. Winful, Brighton; Gene D. Cooperman, Waltham, both of Mass.

[73] Assignee: GTE Laboratories Incorporated, Waltham, Mass.

[21] Appl. No.: 359,736

[22] Filed: Mar. 19, 1982

[51] Int. Cl.³ .............................................. G02B 5/172
[52] U.S. Cl. .............................. 350/96.12; 350/96.34
[58] Field of Search .................... 350/96.12, 96.34; 250/227

[56] References Cited

U.S. PATENT DOCUMENTS

| 3,865,625 | 2/1975 | Yi Cho et al. | 350/96.34 |
| 3,891,302 | 6/1975 | Dabby et al. | 350/96.12 |
| 4,082,419 | 4/1978 | Thompson et al. | 350/96.12 |

Primary Examiner—William L. Sikes
Assistant Examiner—Robert E. Wise
Attorney, Agent, or Firm—Fred Fisher

[57] ABSTRACT

A corrugated nonlinear optical waveguide converts a continuous input light beam into a train of pulses. The waveguide material is indium antimonide (InSb).

2 Claims, 4 Drawing Figures

OPTICAL PULSE GENERATOR

BACKGROUND OF THE INVENTION

1. Field of the Invention

This invention relates to optical pulse generators and to passive devices therefor. Accordingly, it is a general object of this invention to provide new and improved apparatus of such character.

2. Description of the Prior Art

Devices that produce trains of short pulses (pulse-width $\tau_p \lesssim 10$ ps) are useful in optical communications and in many areas of basic physics research. One widely used method of obtaining such pulses is the technique of modelocking in which a property of a laser source (e.g. gain, loss, frequency or injection current) is modulated within the laser cavity itself to produce pulses as short as 0.1 ps. However, not all lasers can be effectively modelocked. Thus, there is a need for passive devices, external to and separate from the laser cavity, which can produce short pulses when excited by a laser of sufficient power.

A known passive pulse generator includes a Fabry-Perot cavity filled with a medium whose refractive index depends on the light intensity. The light-induced changes in refractive index are attributed to two basic mechanisms, one of which is thermal in origin, limiting the speed of the device to the microsecond regime. A Fabry-Perot cavity, however, is not a waveguide structure; it is a bulk structure in which feedback occurs at the end of the medium by means of mirrored reflection. Disadvantageously, it cannot be easily combined with other optical components on one substrate to create an integrated optical circuit.

SUMMARY OF THE INVENTION

Another object of this invention is to provide for new and improved optical pulse generators which rely on the electronic contribution to a nonlinear refractive index, which responds on a time scale of picoseconds or less, to produce subpicosecond pulses.

Still another object of this invention is to provide for a new and improved optical pulse generator device in which the pulse repetition rate is limited by the transit time of light through the device and by the material relaxation time, thereby enabling operating frequencies in excess of hundreds of gigahertz.

Still yet another object of this invention is to provide for a new and improved optical pulse generator in which the pulse shape can be tailored by chirping the frequency of a periodic corrugation in a waveguide or tapering the amplitude of said corrugation.

Yet still another object of this invention is to provide for a new and improved optical pulse generator in which its planar geometry simplifies integration with other optical elements on a single chip.

In accordance with one embodiment of the invention, a passive optical pulse generator device includes a corrugated nonlinear optical waveguide that converts a continuous input light beam into a train of light pulses.

In accordance with another embodiment of the invention, a passive optical pulse generator device includes a thin waveguiding layer of material deposited on a substrate. The material has a large third-order nonlinear susceptibility so that the refractive index of the material changes appreciably in response to changes in light intensity. In accordance with certain features of the invention, the material can be gallium arsenide or indium antimonide. The layer can have one surface in contact with the substrate and can have a second surface not in contact with the substrate, the second surface being formed with periodic corrugations. A cover layer can be in contact with the second surface. In accordance still yet with other features of the invention, the substrate has an index of refraction $n_s$, the nonlinear material has an index of refraction $n_f$, and $n_f$ is greater than $n_s$. The substrate can have an index of refraction $n_s$, the material can have an index of refraction $n_f$, and the cover layer can have an index of refraction $n_c$, wherein $n_f$ is greater than $n_s$, and $n_f$ is greater than $n_c$.

In accordance with still yet another embodiment of the invention, an optical pulse generator includes a substrate which has an index of refraction $n_s$. A thin waveguiding layer of material is deposited on the substrate and the material has an index of refraction $n_f$. The material has a large third-order nonlinear susceptibility so that the refractive index of refraction $n_f$ changes appreciably in response to changes in light intensity. The layer has one surface in contact with the substrate and has a second surface not in contact with the substrate. The second surface is formed with periodic corrugations. The layer has a thickness T measured from the one surface to the closest corrugation. The corrugations have an amplitude A measured from trough to crest of any one of the corrugations. The corrugations have a wavelength $\Lambda$ measured from a crest of one corrugation to a crest of an adjacent corrugation. $n_f$ is greater than $n_s$. Further, the optical pulse generator includes means for introducing coherent light through the layer of material, along a direction parallel to the one surface, at a wavelength $\lambda$. In accordance with certain features of the invention, the material can be gallium arsenide or indium antimonide. Further, as is well known in the art dealing with integrated optics, the dimensions of the guiding layer can be chosen so that in the optimum configuration only one waveguide mode is excited.

BRIEF DESCRIPTION OF THE DRAWINGS

Other objects, advantages and features of this invention, together with its construction and mode of operation, will become more apparent from the following description, when read in conjunction with the accompanying drawings, in which.

DESCRIPTION OF PREFERRED EMBODIMENTS

Figure 1:
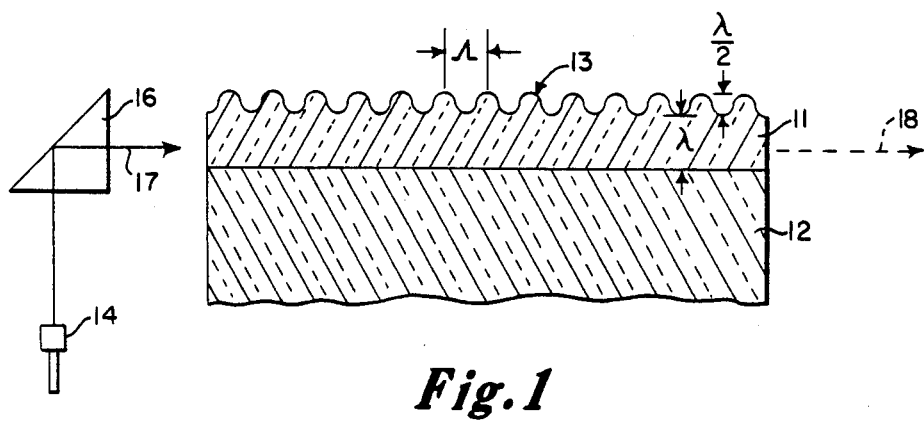
FIG. 1 is a cross-sectional diagram of one embodiment of this invention.

Referring to FIG. 1, there is shown a cross section of one embodiment of the invention including a thin waveguiding layer of material 11 deposited on a substrate 12. The substrate 12 provides mechanical support for the layer of material 11. The material for the guiding layer has a large third-order nonlinear susceptibility so that its refractive index changes appreciably in response to changes in light intensity.

Several suitable materials which have the foregoing property are the semiconductor gallium arsenide (GaAs) and indium antimonide (InSb). The surface of the guiding layer 11 has a periodic corrugation 13 etched into it by using standard techniques. The corrugation 13 serves as a distributed feedback mechanism which coherently scatters a forward going lightwave into a backward one, and vice versa.

The light source can be any laser of sufficient intensity to cause measurable changes in the refractive index of the guiding layer 11.

Such light can be provided by way of a laser 14 which is reflected off a prism 16 along a directed path 17 into the guiding layer 11 along a path parallel to the interface of the layer 11 with the substrate 12, thereby providing a means for coupling the light from the laser 14 into the waveguide. Other methods of coupling light into waveguides are well known to those skilled in the art, and can be used here.

When the input light intensity reaches a certain critical value, the transmitted output consists of a train of pulses 18.

Linear grating structures include those whose refractive indices do not vary with light intensity. Also known as distributed feedback structures, they may include waveguides having a periodic corrugation of their boundaries, or bulk media with a periodic perturbation of the dielectric constant. A light wave interacts strongly with such structures when the period of the corrugations is an integral multiple of one half the light wave in the medium. With such condition, known as the Bragg condition, there is coherent back scattering of a forward-going wave, and the grating acts as a band-rejection filter whose fractional bandwidth in wavelength $\lambda$ is $$(\Delta\lambda)/\lambda \simeq \Lambda/L$$

where $\Lambda$ represents the period of the corrugations and L represents the length of the structure. The center of this band is at the Bragg wavelength $$\lambda_o = 2\, n_f \Lambda$$

where $n_f$ is the refractive index of the medium.

For light whose wavelength lies in the stopband of the filter, the feedback provided by the structure is high, and thus the light intensity is enhanced in the front half of the structure, and falls off exponentially thereafter. Very little light becomes transmitted. For wavelengths outside the stop band, feedback is low, no enhancement of the intensity occurs, and most of the incident light is transmitted.

The distributed feedback structure has an intensity-dependent refractive index when it is constructed of a nonlinear material in accordance with this invention. At low input intensity, the incident light wavelength lies within the stop band. Feedback is high, transmission is low, and the intensity increases in the structure. The high intensity inside the structure changes the refractive index of the grating, thus shifting the stop band. Eventually, the index of the grating is sufficiently changed that the light wavelength no longer lies within the stop band, whereupon feedback is reduced, transmission becomes high, and no intensity enhancement occurs within the grating. This reduction of feedback and of cavity intensity causes the refractive index to relax to its low value. The light wavelength now resides within the stop band, and the feedback again increases. This process continually repeats, producing a train of pulses.

A theoretical description of the pulsing phenomenon can be given based upon Maxwell's equations in a nonlinear medium. The complex amplitudes of the forward-going ($E_F$) and the backscattered ($E_B$) light waves inside the device 11, 12 satisfy the following equations:

$$\frac{\delta E_F}{\delta z} + \frac{1}{V}\frac{\delta E_F}{\delta t} = i\kappa E_B + i\gamma(|E_F|^2 + 2|E_B|^2)E_F$$

$$\frac{\delta E_B}{\delta t} - \frac{1}{V}\frac{\delta E_B}{\delta t} = -i\kappa E_F - i\gamma(|E_B|^2 + 2|E_F|^2)E_B$$

$\kappa$, a coupling constant which measures the amount of feedback due to the corrugations, is directly related to the height thereof.

Nonlinearity of the medium is measured by the constant $\gamma$.

The speed of light in the medium is V.

These equations can be supplemented by one that describes the finite response time of the material nonlinearity.

Figure 2:
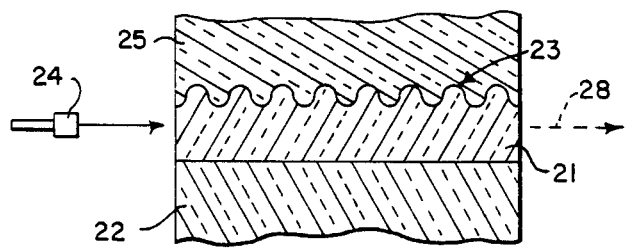
FIG. 2 is a cross-sectional diagram of yet another embodiment of the invention.

FIG. 2 depicts a cross-sectional view of another embodiment of the invention including a thin wave-guiding layer 21 of material (such as GaAs and InSb) which is deposited on a substrate 22. The layer 21 has corrugations 23 on its surface not in contact with the substrate 22. A laser 24 directs a steady coherent path of light into the layer 21. A cover layer 25 encloses the corrugated surface of the layer 21. The index of refraction $n_s$ of the substrate 22 is less than the index of refraction $n_f$ of the layer 21. The index of refraction $n_c$ of the cover layer 25 is less than the index of refraction $n_f$ of the layer 21. A pulsed output beam 28 is emitted from the passive optical pulse generator depicted in FIG. 2.

In the embodiment depicted in FIG. 1, the nonlinear medium 11 has a higher index of refraction $n_f$ than either the index of refraction $n_s$ of the substrate 12 or of air.

Though the embodiments depicted in FIGS. 1 and 2 illustrate a thin wave-guiding layer of material 11, 21 having the upper surface with corrugations 13, 23, it would be obvious to those skilled in the art that the thin wave-guiding layer could be provided with corrugations on both the upper and the lower surfaces, or just the lower surface.

The corrugations can be provided in the layer by well known mechanical means, physically or by etching, or can be provided—in an equivalent manner—by "doping" of the wave-guiding layer of material.

Referring in particular to FIG. 1, the minimum thickness of the layer 11 is the wavelength of the applied light therethrough. The maximum thickness is on the order of five times the wavelength of light through the medium. An optimum thickness, measured from the surface of the layer 11 adjacent to the substrate 12 to trough of the corrugations 13 is the wavelength $\lambda$ of the light emitted by the laser 14 through the medium 11.

The preferred amplitude A of the corrugations, measured from trough to crest, is $\lambda/2$.

Figure 3:
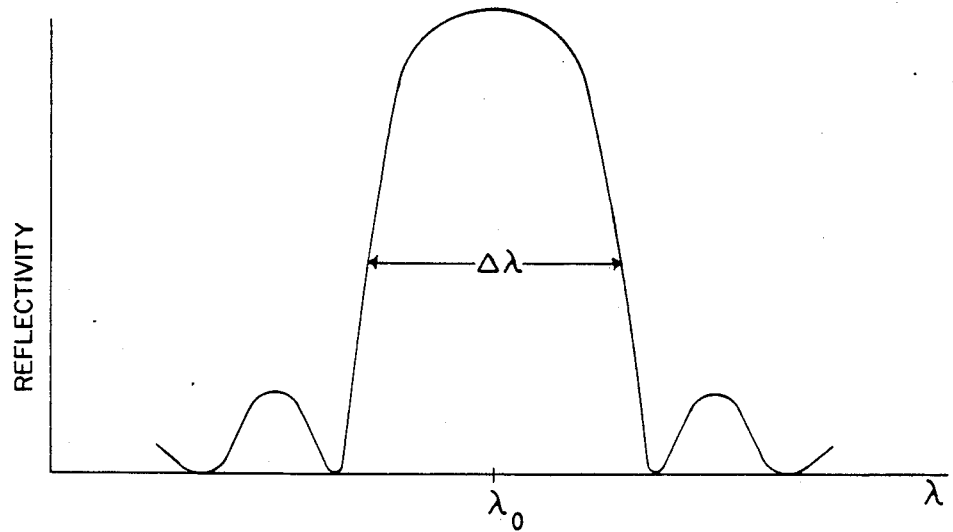
FIG. 3 is a curve which illustrates the reflectivity of a corrugated waveguide used in accordance with the invention.

The value of $\lambda$ should be close to $\lambda_o$. Referring to FIG. 3, as $\lambda$ approaches $\lambda_o$, optimum reflectance occurs within a deviation of $\Delta\lambda$, given by $\Delta\lambda/\lambda \simeq \Lambda/L$, where L is the length of the layer 11.

Figure 4:
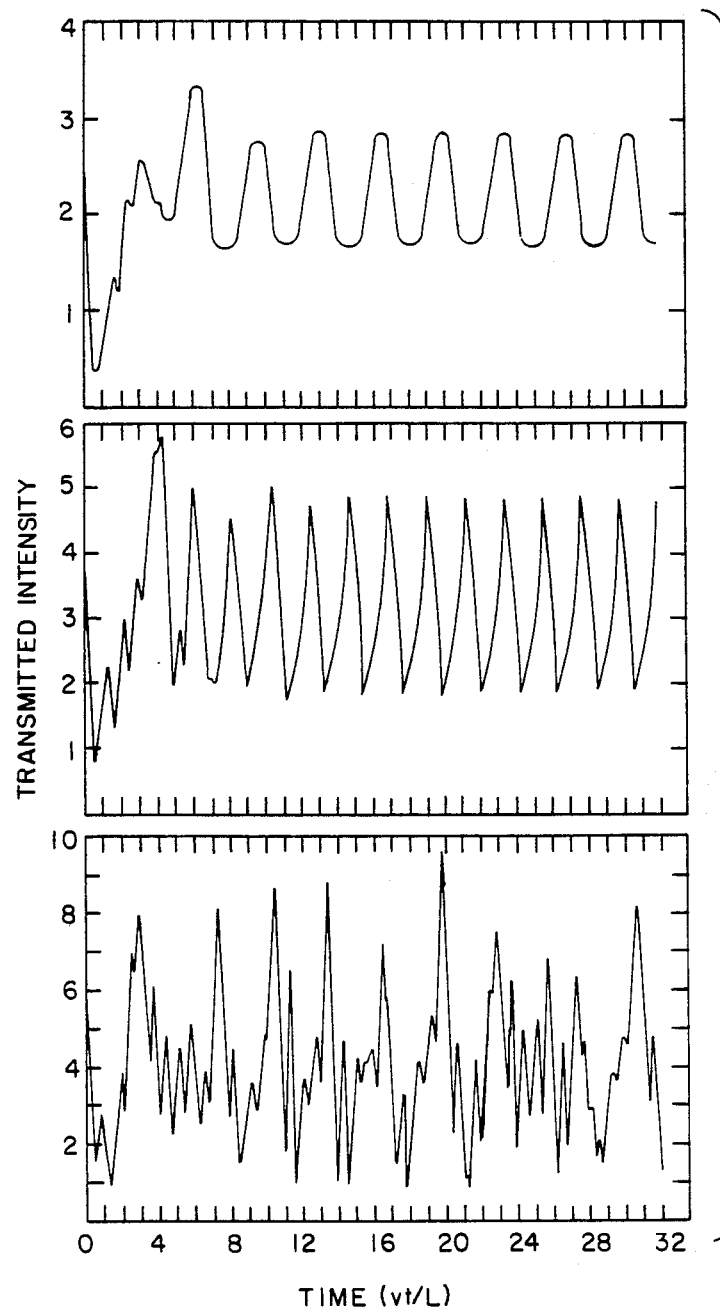
FIG. 4 is a set of three curves for different normalized input intensities I, (a) I=4 (b) I=6 (c) I=9, to illustrate that an output signal consists of a train of pulses even though the input signal is a constant steady beam.

A computer solution to the various equations set forth hereinabove, as indicated in FIG. 4, illustrates that the output does consist of a train of pulses even though the input is a constant steady beam.

Various modifications can be performed without departing from the spirit and scope of this invention.

What is claimed is:

1. A passive optical pulse generator device comprising
    a substrate; and
    a thin wave-guiding layer of material deposited thereon, said material having a large third-order nonlinear susceptibility so that the refractive index of said material changes appreciably in response to changes in light intensity,
    wherein said material is indium antimonide.

2. An optical pulse generator comprising
    a substrate having an index of refraction $n_s$;
    a thin wave-guiding layer of material deposited on said substrate, said material having an index of refraction $n_f$ and having a large third-order nonlinear susceptibility so that the refractive index of refraction $n_f$ changes appreciably in response to changes in light intensity, said layer having one surface in contact with said substrate and having a second surface not in contact with said substrate, said second surface being formed with periodic corrugations, said layer having a thickness T measured from said one surface to the closest corrugation, said corrugations having an amplitude A measured from trough to crest of any one of said corrugations, said corrugations having a wavelength $\lambda_o$ measured from a crest of one corrugation to a crest of an adjacent corrugation, and wherein $n_f$ is greater than $n_s$; and
    means for introducing coherent light through said layer of material, along a direction parallel to said one surface, at a wavelength $\lambda$,
    wherein said material is indium antimonide.

* * * * *